United States Patent [19]

Daniels

[11] 4,136,076

[45] Jan. 23, 1979

[54] INK JET PRINTING COMPOSITION COMPRISING A SOLVENT, A DYE STUFF, A VOLATILE BASE, A MULTI-VALENT METAL AND A POLYMER CONTAINING CARBOXYL GROUPS

[75] Inventor: George R. E. Daniels, Boston, Mass.

[73] Assignee: Dennison Manufacturing Co., Framingham, Mass.

[21] Appl. No.: 845,186

[22] Filed: Oct. 25, 1977

[51] Int. Cl.$^2$ .............................................. C08L 33/02
[52] U.S. Cl. .............................. 260/29.6 HN; 106/22; 260/29.6 M; 260/33.4 R; 346/75
[58] Field of Search ................. 260/29.6 HN, 29.6 M, 260/33.4 R; 106/22

[56] References Cited

U.S. PATENT DOCUMENTS

| | | | |
|---|---|---|---|
| 2,566,443 | 9/1951 | Elmqist | 346/75 |
| 3,060,429 | 10/1962 | Winston | 346/1 |
| 3,416,153 | 12/1968 | Hertz et al. | 346/75 |
| 3,596,275 | 7/1971 | Sweet | 346/1 |
| 3,991,032 | 11/1976 | Pace | 260/29.6 HN |
| 4,024,096 | 5/1977 | Wachtel | 106/22 |

*Primary Examiner*—M. J. Welsh
*Attorney, Agent, or Firm*—Kenneth D. Hudson; George E. Kersey

[57] ABSTRACT

Jet printing is described employing an ink of low viscosity and resistivity having improved resistance to abrasion and solvents after drying. The ink comprises an acrylic polymer, dyestuff, volatile basic compounds, and a complexed multivalent metal ion cross-linking agent dissolved in a solvent vehicle which is predominantly water, a lower alcohol, or mixtures thereof.

10 Claims, No Drawings

INK JET PRINTING COMPOSITION COMPRISING A SOLVENT, A DYE STUFF, A VOLATILE BASE, A MULTI-VALENT METAL AND A POLYMER CONTAINING CARBOXYL GROUPS

This invention relates to ink jet printing, and more particularly to ink jet printing with an improved ink.

Jet printing systems are well known and are described, for example, in U.S. Pat. Nos. 2,566,443; 3,060,429; 3,416,153; and 3,596,275; and in an article entitled "INK JET PRINTING" by Fred J. Kamphoefner, pages 584–592of the *IEEE Transactions on Electron Devices*, Vol. Ed-19, No. 4, April, 1972. In such systems, a stream of ink droplets is generated from a capillary tube and selectively directed toward a target surface. Most commonly, the droplets are charged and selectively deflected as desired by one or more electric fields. The inks employed must have low viscosities for passage through the capillary tube and ejection orifice, and low resistivity for ease of charging. Generally the viscosity should be below about 5 centipoises at 20° C. and preferably is below about 3 centipoises, and the resistivity is below about 3,000 and preferably is below about 1500 ohm-cm.

As shown, for example, in U.S. Pat. No. 4,024,096, suitable viscosities and resistivities for ink jet printing inks have been obtained by employing as solvents lower alcohols, $C_1$ to $C_5$ and preferably methanol, water or mixtures thereof. For printing on absorptive surfaces such as porous paper, dye solutions have been used. For printing on nonsorptive or impervious surfaces such as metal, glass, plastic or ceramics, soluble resin binders have been added, principally shellac or novolac. Small amounts of ionizable salts have also been dissolved in the solvent to increase conductivity where necessary.

Since the materials heretofore employed have been soluble in water or alcohol and have been fixed on the target surface merely by drying, they have relatively low resistance to abrasion and to contact with moisture and alcohol. Moreover, adhesion to some surfaces has been deficient. For many applications, for example product dating or batch coding, improved inks are desirable which have greater permanence.

The theory of the type of polymer system employed in the present invention is not new and substances with similar characteristics have been used as floor polishes, removable protective coatings, and as pigmented viscous inks for more conventional printing processes. The special demands of ink jet printing, however, particularly with respect to the resistivity of the ink, imposes further important specifications for a desirable ink composition. For this reason, many of the presently known substances would be unsuitable for ink jet printing.

It is a primary object of the present invention to provide improved ink jet printing with inks which are easily formulated, readily applied to a variety of target surfaces, provide good stability in the printing apparatus, and which assure greater permanence and adhesion to target surfaces. It is a further object to employ inks for jet printing which are stable in solution but which rapidly cross-link merely by drying. It is another object of the invention to provide an ink jet printing method utilizing inks of low resistivity for ease of charging.

SUMMARY OF THE INVENTION

In accomplishing the foregoing and related objects, the improved ink jet printing of the invention employs inks containing as binders polymers which have unesterified free carbonyl groups along their chains; for example, polymers or copolymers of acrylic or lower alkyl acrylic acids. In accordance with one aspect of the invention, these polymers are soluble in basic solutions of alcohol or water containing substantial dissolved dyestuff, and can be rapidly cross-linked with multivalent metal ions such as zinc or the like. In accordance with the related aspect of the invention, where the solubilizing base is volatile, for example ammonia obtained from a source such as ammonium hydroxide, ammonium carbonate, morpholine or the like, the cross-linking ionic bonds are rapidly formed merely on drying. After drying, and removal of base by evaporation, the cross-linked polymer is insoluble in water and alcohol and is resistant to removal by abrasion. In accordance with a further related aspect of the invention, the ink can nevertheless be removed by vigorous application of alkaline solutions, which is an advantage for cleaning the printing apparatus and in applications such as coding and recoding of reusable containers.

In accordance with yet another aspect of the invention, a readily ionizable salt may be employed to lower resistivity of the ink, although sufficient conductivity is typically obtained without the use of such a salt.

DETAILED DESCRIPTION

According to the present invention, the improved jet printing is obtained employing an ink comprising the ingredients in approximately the proportions by weight shown in Table 1 below.

TABLE 1

| Ingredient | Broad Range | Preferred Range |
|---|---|---|
| (1) Acrylic polymer | 2 – 8% | 3 – 5% |
| (2) Soluble dye, % of (1) | 10 – 100% | 30 – 70% |
| (3) Volatile base, to pH | >7.5 | >8 |
| (4) Multivalent metal ion | sufficient to polymerize (1) on drying | |
| (5) Ionizing salt | 0 – 2% | none |
| (6) Drying retardant | 0 – 30% | 10 – 25% |
| (7) Primary solvent | balance | balance |
| Viscosity, 20° C. | <5 cps | <3 cps |
| Resistivity, ohm-cm | <3000 | <1500 |

The acrylic polymer may be of any of a number of known polymers of acrylic or lower alkyl acrylic which have a plurality of carboxyl groups and which are soluble in basic ammonia water solutions. Such materials are commercially available as RHOPLEX B-336 of the Rohm and Haas Company; BRIGHT PLATE 23 and JONCRYL of S. C. Johnson and Sons, Inc.; and as CARBOSET resins from the B. F. Gooorich Chemical Co. While higher molecular weight materials can be employed, low to moderate molecular weights are preferred to obtain higher polymer content in the low viscosity inks. Any suitable soluble dye can be employed. Basic and acid dyes are suitable with basic dyes being preferred.

The primary solvent is water, a lower alcohol, preferably methanol, or mixtures thereof. Additional higher boiling solvents may be employed as drying retardants, for example alcohols, glycols, glycol ethers, or mixtures thereof having from about 6 to 16 carbon atoms and which are miscible with the primary solvent.

Any suitable volatile base can be employed, preferably a source of ammonia such as ammonium hydroxide, ammonium carbonate, morpholene or the like, or mixtures thereof. A readily ionizable salt, for example potassium thiocyanate or the like, can also be employed to lower resistivity of the ink if necessary. However, such water soluble salts can increase the water sensitivity of the dried inks and are preferably omitted. Normally, sufficient conductivity is obtained in the ink from the ionizing polymer, dyes and volatile bases employed.

Any suitable multivalent metal ion complex stable in basic solution but ionically cross-linking the polymer under lower pH conditions may be employed. A number of such metal ions are known. Zinc which forms a complex with ammonia and readily cross-links the acrylic polymers in the absence of ammonia is preferred. Other usable metals include calcium, cadmium, cobalt, copper, nickel, aluminum, tin and zirconium suitably complexed in basic solution. Complexes thereof are disclosed for example in U.S. Pat. Nos. 2,849,334 and 2,919,205. Commercial solutions of acrylic polymers are available which include zinc ammonia complexes. Where addition is necessary, a suitable zinc solution may be made by dissolving zinc oxide in ammonia water, for example in the following weight proportions:

Zinc oxide: 7.2
Water: 71.4
Concentrated Ammonium hydroxide: 8.7
Ammonium carbonate: 12.7

Sufficient complex ion solution should be included to polymerize the polymer on drying, for example up to about 15 parts of the above zinc ammonia solution per 100 parts of acrylic polymer.

| Preferred Example | |
|---|---|
| BRIGHT PLATE 23 | 20.9 |
| Soluble dye | 1.5 |
| Ammonium carbonate, 10% in $H_2O$ | 6.67 |
| Methanol | 50.0 |
| Methyl cellosolve | 4.3 |
| Ethylene glycol monobutyl ether | 16.0 |

The resulting solution was filtered (approximately one micron pore size) and thereafter had a resistivity of 444 ohm cm., a viscosity at 20° C. of 2.45 centipoises, and a pH of 8.8. BRIGHT PLATE 23 is the product of S. C. Johnson & Sons, Inc. and comprises an acrylic polymer, about 16% by weight solids, in a basic water solution of zinc ions and ammonia. The soluble dye is preferably a basic dye, for example Rhodamine B, basic violet 10, C.I. 45170.

In the above example, methyl cellosolve and ethylene glycol monobutyl ether are employed as drying retardants to prevent premature drying in the capillaries or other portions of the jet printing apparatus. Rapid drying on the target is obtained. Still faster drying can be obtained by omitting the retardants if desired. While a mixture of methanol and water is employed as the primary solvent, either may be employed alone if desired. The present invention permits the use of water alone which is an advantage in cost, flammability, and toxicity.

Extended testing of ink jet printing employing the ink of the preferred example has shown long successful printing runs without clogging of the capillaries, with rapid drying, with good extended print quality, and with good adhesion and permanence to a variety of surfaces, including metal and plastic.

The inks of the present invention are believed to be true solutions. However, colloidal solutions may be used if filterable without substantial separation through a filter having a pore size substantially smaller than the printer capillary tube, for example through a filter having a pore size of about one micron. Minor amounts of other compatible ingredients may also be included. For example, minor amounts of other resins compatible with the acrylic polymer may be used as adhesion promoters for particular surfaces. Also, chelating agents such as ethylene diamine tetraacetic acid or the like may be included as scavengers for metal ion impurities to promote stability.

It should be understood that the foregoing description is for the purpose of illustration and that the invention includes all equivalents and modifications within the scope of the appended claims.

What is claimed is:

1. The method of ink jet printing employing a jet printing ink having a viscosity below about 5 cps at 20° C. and an electrical resistivity below about 3000 ohm cm., said ink comprising a solvent consisting predominantly of water, lower alcohols, or mixtures thereof and having dissolved therein soluble dyestuff, a volatile base, film-forming polymer means, and multivalent metal ion means for cross-linking said polymer on drying, said polymer containing carboxyl groups substantially inert to said metal ion means in the presence of said volatile base but being cross-linked therewith upon evaporation thereof to form an ionically cross-linked polymer substantially insoluble in water, said soluble dyestuff being present in an amount equal to at least about 10% of the dry weight of said polymer.

2. The ink jet printing method according to claim 1 wherein said polymer means comprises an acrylic polymer and said base comprises a source of ammonia sufficient to provide a pH greater than about 7.5.

3. The ink jet printing method according to claim 2 wherein said metallic ion means comprises zinc.

4. The ink jet printing method according to claim 2 wherein said polymer contains from about 2 to about 8 percent by weight of said polymer.

5. The ink jet printing method according to claim 4 having a resistivity below about 1500 ohm cm. and comprising by weight about 2 to 8 percent polymer, 1 to 8 percent dyestuff, sufficient volatile base to provide a pH greater than about 7.5, from 0 to about 2 percent ionizable salt means for increasing conductivity, and sufficient solvent to provide a viscosity below about 3 cps at 20° C.

6. The ink jet printing method according to claim 5 comprising about 3 to 5 percent polymer and about 1 to 3 percent dyestuff, said polymer being a polymer of acrylic or lower alkyl acrylic acid.

7. The ink jet printing method according to claim 1 wherein said solvent includes a minor portion of a drying retardant comprising an alcohol, glycol, glycol ether, or mixtures thereof having from about six to sixteen carbon atoms.

8. A jet printing ink having a viscosity below about 5 cps at 20° C. and an electrical resistivity below about 3000 ohm cm., said ink comprising a solvent consisting predominantly of water, lower alcohols, or mixtures thereof and having dissolved therein soluble dyestuff, a volatile base, film-forming polymer means and multivalent metal ion means for cross-linking said polymer on drying, said polymer containing carboxyl groups substantially inert to said metal ion means in the presence of said volatile base but being cross-linked therewith upon evaporation thereof to form an ionically cross-linked polymer substantially insoluble in water, said soluble dyestuff being present in an amount equal to at least about 10% of the dry weight of said polymer.

9. An ink according to claim 8 wherein said polymer means comprises an acrylic polymer and said base comprises a source of ammonia sufficient to provide a pH greater than about 7.5.

10. An ink according to claim 8 wherein said solvent includes a minor portion of a drying retardant comprising an alcohol, glycol, glycol ether, or mixtures thereof having from about six to sixteen carbon atoms.

* * * * *